(12) United States Patent  
Choi et al.

(10) Patent No.: US 8,717,198 B2  
(45) Date of Patent: May 6, 2014

(54) COMMUNICATION CONNECTING APPARATUS AND METHOD FOR DETECTING MOBILE UNITS IN A VEHICLE

(75) Inventors: Sungha Choi, Seoul (KR); Sungah Ahn, Seoul (KR); Jungwoo Kim, Seoul (KR); Soohwan Oh, Yongin-Si (KR); Kyunggeun Kim, Seongnam-Si (KR)

(73) Assignee: LG Electronics Inc., Seoul (KR)

( * ) Notice: Subject to any disclaimer, the term of this patent is extended or adjusted under 35 U.S.C. 154(b) by 312 days.

(21) Appl. No.: 13/269,176

(22) Filed: Oct. 7, 2011

(65) Prior Publication Data

US 2012/0242510 A1 Sep. 27, 2012

Related U.S. Application Data

(60) Provisional application No. 61/467,713, filed on Mar. 25, 2011.

(51) Int. Cl.
*G08B 21/00* (2006.01)

(52) U.S. Cl.
USPC ............... 340/988; 340/995.1; 455/3.06

(58) Field of Classification Search
USPC ............ 340/988, 989, 995.1, 995.26, 539.16, 340/539.17; 455/41.2, 41.3, 3.06
See application file for complete search history.

(56) References Cited

U.S. PATENT DOCUMENTS

2012/0050012 A1* 3/2012 Alsina et al. ............... 340/10.1

* cited by examiner

*Primary Examiner* — Jeffery Hofsass
(74) *Attorney, Agent, or Firm* — Birch, Stewart, Kolasch & Birch, LLP

(57) ABSTRACT

A vehicle communication connecting apparatus capable of displaying representative images of one or more communication-supported mobile terminals, detected as being present within a vehicle, to allow the mobile terminals to be easily distinguishable, and an operation method thereof. A vehicle communication connecting apparatus, which is connected to one or more communication-supported mobile terminals present within a vehicle so as to be capable of simultaneously or selectively displaying execution results of applications, which are being executed in the respective connected mobile terminals, and an operation method thereof.

20 Claims, 11 Drawing Sheets

COMMUNICATION CONNECTING APPARATUS AND METHOD FOR DETECTING MOBILE UNITS IN A VEHICLE

CROSS-REFERENCE TO RELATED APPLICATION

Pursuant to 35 U.S.C. §119(e), this application claims the benefit of earlier filing date and right of priority to U.S. Provisional Application No. 61/467,713, filed on Mar. 25, 2011, the contents of which is incorporated by reference herein in its entirety.

BACKGROUND OF THE INVENTION

1. Field of the Invention

This invention relates to a communication connecting apparatus and method, and particularly, to a vehicle communication connecting apparatus connected to a mobile terminal present within the vehicle, and an operation method thereof.

2. Background of the Invention

A communication connecting apparatus is an apparatus which includes a function of outputting images and sounds (video and audio) which a user is visible and audible. The user can view various images via the communication connecting apparatus fixedly or detachably mounted in a vehicle. Such communication connecting apparatus may be connected to an external device via an external terminal or the like.

SUMMARY OF THE INVENTION

An aspect of the detailed description is to provide a vehicle communication connecting apparatus, which searches for one or more communication-supported mobile terminals within the vehicle and displays a representative image of the mobile terminals for easy discrimination, or an operation method thereof.

Another aspect of the detailed description is to provide a vehicle communication connecting apparatus, which is connected to one or more communication-supported mobile terminals present within the vehicle to integrally display execution results of applications, which are being executed in the respective mobile terminals, on a single device, and an operation method thereof.

To achieve these and other advantages and in accordance with the purpose of this invention, as embodied and broadly described herein, a vehicle communication connecting apparatus according to a first embodiment may include an input unit configured to receive a request for searching for mobile terminals present within a vehicle, a sensing unit configured to detect one or more mobile terminals allowed for a wired or wireless communication based on identification data of the mobile terminals in response to the request, a communication unit configured to receive each representative image from the detected mobile terminals, the representative images allowing the detected mobile terminals to be easily distinguishable, and a display unit configured to display each of the received representative images on a screen.

In another embodiment, the vehicle communication connecting apparatus may include a display unit configured to acquire location information related to each mobile terminal from the communication unit, and display the representative images by considering a relative location of each mobile terminal, recognized based on the location information.

To achieve these and other advantages and in accordance with the purpose of this invention, as embodied and broadly described herein, a vehicle communication connecting apparatus according to a second embodiment may include an input unit configured to allow a user to request for searching for mobile terminals present within a vehicle, a sensing unit configured to detect one or more mobile terminals allowed for a wired or wireless communication based on identification data of the mobile terminals in response to the request, an interface unit configured to transfer command signals to the detected mobile terminals or receive command signals from the detected mobile terminals when the detected mobile terminals are connected, a communication unit configured to receive in real time execution results of applications being executed in the respective connected mobile terminals, and a display unit configured to integrally display execution results of each application when execution results of a plurality of applications are provided.

In another embodiment, the vehicle communication connecting apparatus may include a display unit configured to display execution results of each application according to a user preference and an event importance by adjusting update speed, screen size and volume of each execution result. In another embodiment, the apparatus may include a display unit configured to display execution results of each application by using a virtual frame buffer when the connected mobile terminal is a device for which a screen is not supported.

To achieve these and other advantages and in accordance with the purpose of this invention, as embodied and broadly described herein, an operation method for a vehicle communication connecting apparatus according to a first embodiment may include receiving a request for searching for mobile terminals present within a vehicle by a user input, detecting one or more mobile terminals allowed for a wired or wireless communication based on identification data of the mobile terminals in response to the request, receiving each representative image from the detected mobile terminals, the representative images allowing the detected mobile terminals to be easily distinguishable, acquiring location information related to each of the detected mobile terminals, and displaying each of the received representative images by considering a relative location of each mobile terminal recognized based on the acquired location information.

To achieve these and other advantages and in accordance with the purpose of this invention, as embodied and broadly described herein, an operation method for a vehicle communication connecting apparatus according to a second embodiment may include receiving a request for searching for mobile terminals present within a vehicle by a user input, detecting one or more mobile terminals allowed for a wired or wireless communication based on identification data of the mobile terminals in response to the request, connecting to the detected mobile terminals, receiving execution results of a first application received from a first mobile terminal connected and execution results of a second application received from a second mobile terminal connected when a plurality of mobile terminals are connected, and integrally simultaneously displaying the received execution results of the first and second applications on a screen.

According to an embodiment of the invention, there is an electronic device configured to be installed in a vehicle and that includes: a display unit; a wireless communication device; a controller operatively connected to the display unit and the wireless communication device. The controller is configured to simultaneously interface with a first mobile terminal within the vehicle and a second mobile terminal within the vehicle, the first mobile terminal performing a first function and the second mobile terminal performing a second function different that the first function, and display information regarding at least one of the first function and the second function.

According to an embodiment of the invention, there is a method of controlling an electronic device installed in a vehicle. The method includes: simultaneously interfacing with a first mobile terminal within the vehicle and a second mobile terminal within the vehicle, the first mobile terminal performing a first function and the second mobile terminal performing a second function different that the first function; and displaying information regarding at least one of the first function and the second function Further scope of applicability of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, exemplary embodiments associated with the present disclosure will be described in more detail with reference to the accompanying drawings. Suffixes "module" and "unit" used for constituent elements disclosed in the following description are merely intended for easy description of the invention without giving any special meaning or function. The suffixes "module" and "unit" may be used together.

In addition, the exemplary embodiments associated with the present disclosure are described in detail with reference to the accompanying drawings and contents disclosed in the accompanying drawings, but this invention may not be restricted or limited by those exemplary embodiments.

Terms used in this specification are selected from commonly used terms as much as possible with considering functions of the exemplary embodiments, so those terms may change according to an intension of a skilled person in this art, a convention, an appearance of a new technology and the like. Also, for a specific case, there may be a term which is randomly designated by the applicant, and in this case, the meaning of the term will be described in the corresponding description part of this specification. Therefore, it should be noticed that the terms used in this specification will be construed based on the meaning that the corresponding terms actually have and the overall description of this specification.

Figure 1:
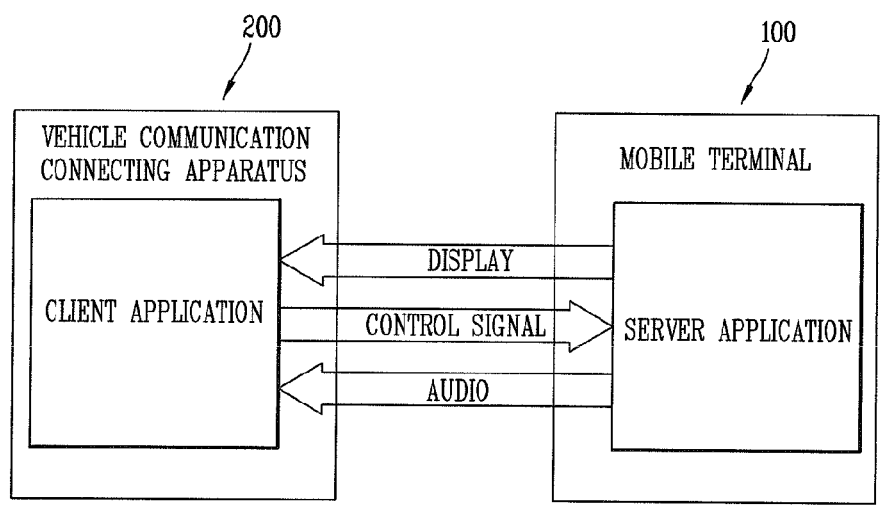
FIG. 1 schematically illustrates a vehicle communication connecting apparatus and a vehicle-mounted mobile terminal connected to the apparatus according to an embodiment of the invention.

FIG. 1 schematically illustrates a vehicle communication connecting apparatus and a vehicle-mounted mobile terminal connected to the apparatus in accordance with this invention. As illustrated, FIG. 1 includes a vehicle-mounted mobile terminal 100 and a vehicle communication connecting apparatus 200.

The mobile terminal 100 may be connected to the vehicle communication connecting apparatus 200 via a wire or wirelessly, and transmit to the vehicle communication connecting apparatus 200, via an interface, at least one of a screen image and voice (audio) as execution results of an application, which is executed in the mobile terminal 100. Herein, the mobile terminal 100 is typically located within a vehicle but may not be limited to the location. Alternatively, the mobile terminal 100 may be located outside the vehicle within a range of being wirelessly connectable to the vehicle communication connecting apparatus 200.

The vehicle communication connecting apparatus 200, which is connected to at least one mobile terminal 100 via a wire or wirelessly, may receive at least one of the screen image and the voice from the connected mobile terminal 100 and output the received at least one of the screen image and the voice. The vehicle communication connecting apparatus 200 may be located within a vehicle and fixedly or detachably mounted thereto.

The vehicle communication connecting apparatus 200 may receive a specific command from a user via an interface and transmit the specific command to the connected mobile terminal 100. For example, when the user touches or presses a touchpad or a keypad, which is output on a screen of the vehicle communication connecting apparatus 200, to input a specific command, the vehicle communication connecting apparatus 200 senses a location of the input-applied point and transmits information related to the sensed location to the mobile terminal 100.

The mobile terminal 100 may determine that a touch event has been generated at the touch input-applied point, and thus perform an operation corresponding to the generated event. That is, the user may control operations of the mobile terminal 100 using the touchpad, the keypad and the like provided on the vehicle communication connecting apparatus 200.

As one detailed example, when the vehicle communication connecting apparatus 200 and the mobile terminal 100 are connected to each other, the user executes a road guidance application (or dialing, phonebook, e-mail, video reproducing or the like) installed in the mobile terminal 100, and the mobile terminal 100 is allowed to transmit an execution image of the road guidance application to the vehicle communication connecting apparatus 200 so as to make the execution image of the road guidance application displayed on the vehicle communication connecting apparatus 200. In other words, the user may view the execution image of the road guidance application on a large screen of the vehicle communication connecting apparatus 200 other than a small screen of the mobile terminal 100. Also, the user may hear a road guidance voice via a speaker mounted in the vehicle other than a speaker of the mobile terminal 100.

Also, when the user selects a menu relating to a road guidance using a touchpad or keypad provided on the vehicle communication connecting apparatus 200, then the mobile terminal 100 is allowed to perform an operation of the corresponding selected menu as it is. Namely, it is similar to the mobile terminal 100 being remotely controlled by the vehicle communication connecting apparatus 200. The mobile terminal 100 then transmits execution results of the operation relating to the selected menu to the vehicle communication connecting apparatus 200 and the execution result is output on the vehicle communication connecting apparatus 200.

The mobile terminal 100 and the vehicle communication connecting apparatus 200 may be connected to each other using a short-range communication standard such as Bluetooth or the like, an Internet standard such as Wi-Fi or the like, an external device interface standard such as Universal Serial Bus (USB) or the like, etc.

The mobile terminal 100 may include a server application installed therein to provide a service in response to a client request, and the vehicle communication connecting apparatus 200 may include a client application installed therein to allow access to a service provided from a server.

The server application of the mobile terminal 100 may capture a screen of the mobile terminal 100 regardless of a type of application of the mobile terminal 100, and may transmits the captured screen to the client application of the vehicle communication connecting apparatus 200. Also, the server application controls operations of the mobile terminal, based upon information related to an event generated in the vehicle communication connecting apparatus 200, transmitted by the client application.

For example, the vehicle communication connecting apparatus 200 may remotely control the mobile terminal 100 by a Virtual Network Computing (VNC) method, which uses a Remote Frame Buffer (RFB) protocol supporting a remote access with respect to a Graphical User Interface (GUI). The VNC method is configured such that the mobile terminal 100 transfers a screen update to the vehicle communication connecting apparatus 200 and the vehicle communication connecting apparatus 200 transmits a generated input event to the mobile terminal 100, via a network.

The mobile terminal 100, for example, may transmit voice (audio) to the vehicle communication connecting apparatus 200, a headset, a hands-free and the like, according to an Advanced Audio Distribution Profile (A2DP), which defines a voice quality of an audio (stereo or mono), which is to be streamed from a first device to a second device via a Bluetooth connection, especially, Headset Profile (HSP) related to Bluetooth headset, especially, Hands-Free Profile (HFP) applied to a hands-free kit for vehicle.

Meanwhile, the vehicle communication connecting apparatus 200 and the mobile terminal 100 may exchange additionally required information with each other based upon a separate protocol. For example, the vehicle communication connecting apparatus 200 may provide the mobile terminal 100 with vehicle status information, such as traveling information, speed information, fuel information and the like.

Some applications installed in the mobile terminal 100 may use the vehicle status information received from the vehicle communication connecting apparatus 200 using separate protocols. Such applications may provide the vehicle communication connecting apparatus 200 with application related information, such as an application type (for example, a road guidance, multimedia, game, etc.), a GUI type (for example, map, video, menu, etc.), an application state (for example, being executed at a foreground or background, etc.) and the like.

Figure 2:
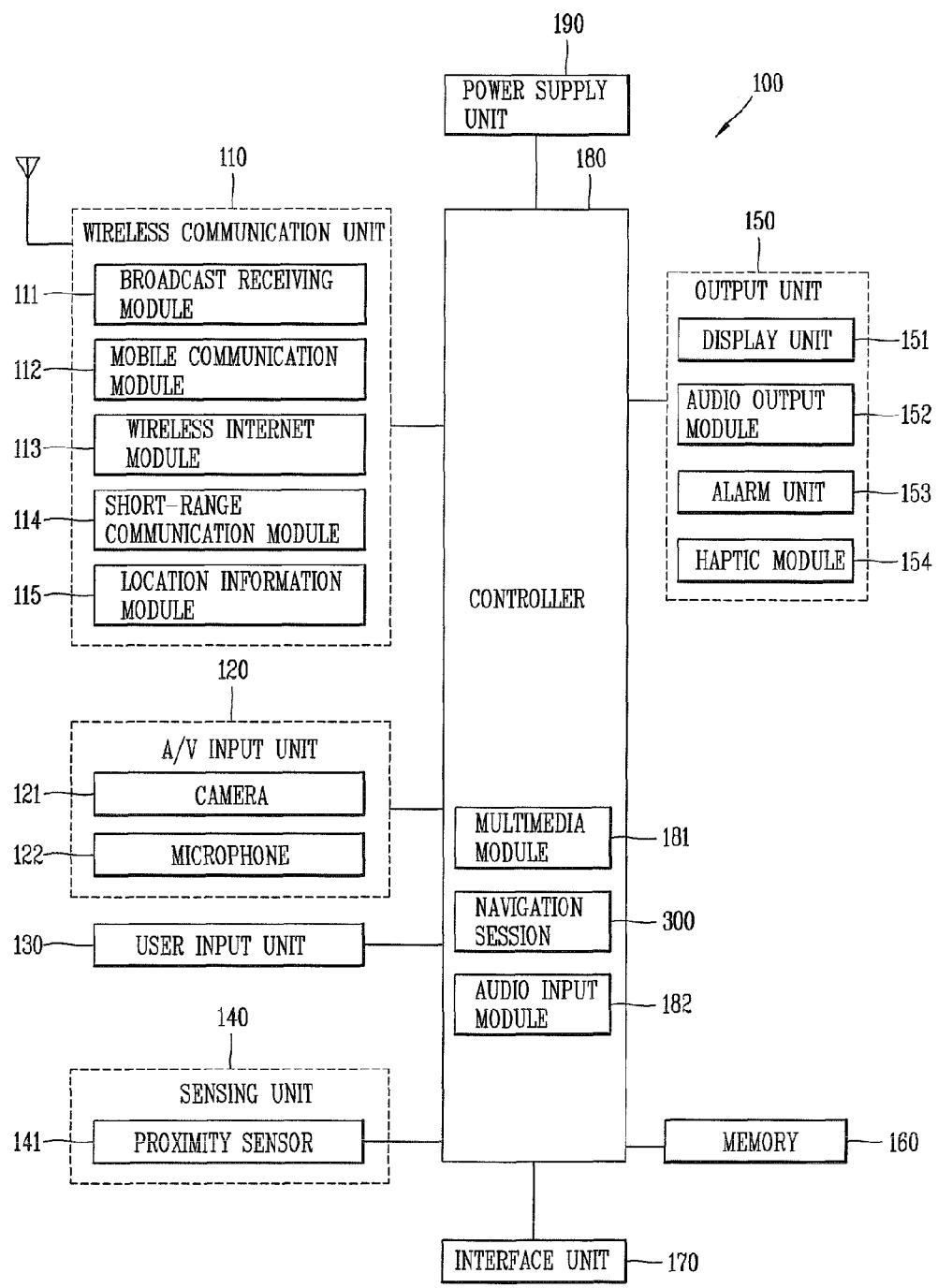
FIG. 2 is a block diagram of the vehicle-mounted mobile terminal illustrated in FIG. 1 according to an embodiment of the invention.

FIG. 2 is a block diagram illustrating in detail an example of the configuration of the vehicle-mounted mobile terminal illustrated in FIG. 1. The mobile terminal 100 may be implemented in various types. Examples of the mobile terminal 100 may include a cellular phone, a smart phone, a laptop computer, a digital broadcasting terminal, a Personal Digital Assistants (PDA), a Portable Multimedia Player (PMP) and the like.

As illustrated in FIG. 2, the mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, all of the elements as illustrated in FIG. 2 are not necessarily required, and the mobile terminal may be implemented with greater or less number of elements than those illustrated elements.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115 and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may also be provided through a mobile communication network, and in this case, the broadcast associated information may be received by the mobile communication module 112. The broadcast associated information may exist in various forms. For example, the broadcast associated information may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (Media FLO), digital video broadcast-handheld (DVB-H), integrated services digital broadcast-terrestrial (ISDB-T), and the like. The broadcast receiving module 111 may be configured to be suitable for every broadcast system that provides a broadcast signal as well as the above-mentioned digital broadcast systems.

The mobile communication module 112 transmits and/or receives a radio signal to and/or from at least one of a base station, an external terminal and a server over a mobile communication network. In this exemplary embodiment, the radio signal may include a voice call signal, a video call signal and/or various types of data according to text and/or multimedia message transmission and/or reception.

The wireless Internet module 113 is a module for supporting wireless Internet access. The wireless Internet module 113 may be built-in or externally installed to the mobile terminal 100. In this exemplary embodiment, the wireless Internet module 113 may use a wireless Internet access technique including a Wireless LAN (WLAN), Wi-Fi, Wireless Broadband (Wibro), World Interoperability for Microwave Access (Wimax), High Speed Downlink Packet Access (HSDPA), and the like.

The short-range communication module 114 is a module for supporting a short-range communication. In this exemplary embodiment, the short-range communication module 114 may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, such as a GPS module. The GPS module may receive location information in cooperation with associated multiple satellites. Here, the location information may include coordinates information represented by latitude and longitude. For example, the GPS module can measure accurate time and distance respectively from more than three satellites so as to accurately calculate a current location of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as location on latitude, longitude and altitude, from the location information received from the satellites. Wi-Fi Locating System and/or Hybrid Locating System may be applied as the location information module 115.

The location information module 115 may further include a geomagnetic sensor and/or a gravity sensor for detecting an orientation. For example, the location information module 115 may detect an orientation (for example, east, west, south or north direction) of a mobile terminal by the geomagnetic sensor (digital magnetic compass) for implementing a navigation using augmented reality. The location information module 115 may detect to which direction gravity is applied by using the gravity sensor (G sensor). When the location information module 115 detects that a user holds the mobile terminal long in a vertical direction, a screen which is long in the vertical direction is output, and when holding the mobile terminal long in a horizontal direction, a screen automatically rotates by 90° to output a horizontally wide screen. Also, when the user watches a video (moving picture), the location information module 115 may rotate a screen in a direction that the user holds the mobile terminal through the gravity sensor (G sensor) such that the user can watch the video in a comfortable state.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like. A layered structure of the touchpad and the display unit 151 may be referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, and the like.

The output unit 150 is configured to output an audio signal, a video signal or an alarm signal. The output unit 150 may include a display unit 151, an audio output module 152, an alarm 153, a haptic module 154, and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. The display unit 151 may be implemented in two or more in number according to a configured aspect of the mobile terminal 100. For instance, the mobile terminal 100 may include both an external display unit (not shown) and an internal display unit (not shown).

Here, if the display unit 151 and a touch sensitive sensor (referred to as a 'touch sensor') have a layered structure therebetween, the display unit 151 may be used as an input device as well as an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched location and a touched area, but also a touch pressure. When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

A proximity-touch in this invention indicates that a pointer does not actually touch a screen but approaches the screen by being apart therefrom by a predetermined distance.

The proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is located to be proximate onto the touch screen without contact will be referred to as 'proximity touch', whereas a status that the pointer substantially comes in contact with the touch screen will be referred to as 'contact touch'. The location corresponding to the proximity touch of the pointer on the touch screen indicates a location where the pointer faces perpendicular to the touch screen upon the proximity touch of the pointer.

The proximity sensor 141 senses a proximity touch and proximity touch patterns (e.g., distance, direction, speed, time, location, moving status, etc.). Information relating to the sensed proximity touch and the sensed proximity touch patterns may be output onto the touch screen.

The sensing unit 140 may include an acceleration sensor (not shown). The acceleration sensor is a device for changing an acceleration change in one direction into an electrical signal, and is widely used with the development of a micro-electromechanical systems (MEMS) technology. The acceleration sensor may include various types, starting from a sensor, which is mounted in an airbag of a vehicle for measuring a great acceleration value used for detecting a collision, to a sensor, which recognizes a delicate operation of a human hand(s) to measure a minute acceleration value used as an input element of games or the like. The acceleration sensor may be typically configured by mounting two or three axes in one package, and alternatively require only Z-axis depending on usage environments. Hence, if X-axial or Y-axial acceleration sensor should be used instead of Z-axial acceleration sensor in some reason, an acceleration sensor may be mounted by erecting the acceleration sensor on a primary board using a separate plate.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. When a call signal received or a message received, the alarm unit 153 may vibrate the mobile terminal using a vibration element for notifying the reception. Also, when a key signal input, the alarm unit 153 may vibrate the mobile terminal 100 using a vibration element for providing a feedback concerning the key signal input. A user can recognize the event generation by the vibration. Alternatively, the signal for notifying the event generation may be output via the display unit 151 or the audio output module 152.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various haptic effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100. The haptic module 154 may be provided at a location of being frequently contactable with the user within the vehicle, for example, provided in a steering wheel, a transmission gear lever, a seat and the like.

The memory 160 may store a program for the processing and control of the controller 180. Alternatively, the memory 160 may temporarily store input/output data (e.g., phonebook data, messages, still images, video and the like).

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal 100 with external devices. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port. The interface unit 170 may be configured to receive data or power from an external device to transmit the received data or power to each component inside the mobile terminal 100, or may be configured to transmit data inside the mobile terminal 100 to an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180. For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The audio input module 182 may recognize a voice spoken by a user and perform a corresponding function according to the recognized voice signal.

A navigation session 300 applied to the mobile terminal 100 may display a traveling path on map data.

Figure 3:
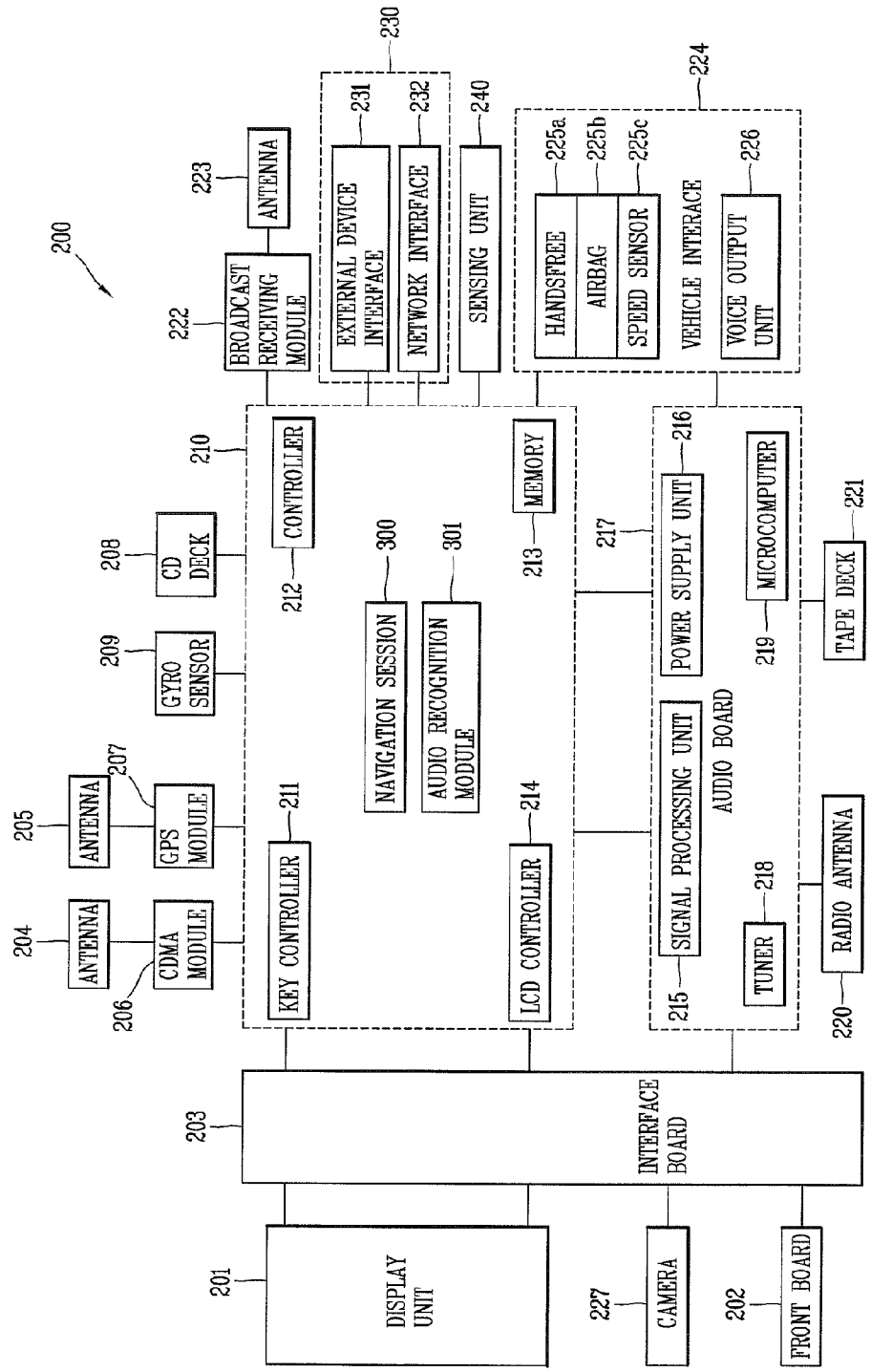
FIG. 3 is a block diagram illustrating one example of the vehicle communication connecting apparatus according to an embodiment of the invention.

FIG. 3 is a block diagram illustrating in detail a configuration of a vehicle communication connecting apparatus according to this invention. As illustrated in FIG. 3, the vehicle communication connecting apparatus 200 may include a main board 210. The main board 210 may include a controller 212 (for example, a Central Processing Unit (CPU)) for executing overall controls of the vehicle communication connecting apparatus 200, a memory 213 for storing a program for processing and control of the controller 212 and input/output data, a key controller 211 for control of various key signals, and a Liquid Crystal Display (LCD) controller 214 for control of an LCD.

The memory 213, for example, may store map information (map data) for displaying road guidance information on a digital map. Also, the memory 213 may store a traffic information collection and control algorithm for allowing a user to input traffic information according to a present condition of a road on which the vehicle is currently traveling, and information for controlling the algorithm.

The main board 210 may include or interface with a Code Division Multiple Access (CDMA) module 206 built in a vehicle and provided with a uniquely given device number, a GPS module 207 for receiving a GPS signal to guide a location of a vehicle, track a traveling route from a depart point to an arrival point, etc., or for transmitting traffic information collected by a user as a GPS signal, a CD deck 208 for reproducing a signal recorded on a compact disk (CD), a gyro sensor 209 and the like. The CDMA module 206 and the GPS module 207 may transfer and receive signals via antennas 204 and 205.

Also, a broadcast receiving module 222 may be connected to the main board 210 and receive a broadcasting signal via an antenna 223. The main board 210 may also be connected with a display unit (LCD) 201 controlled by the LCD controller 214 via an interface board 203, a front board 202 controlled by the key controller 211, and a camera 227 for capturing inside and/or outside of the vehicle. The display unit 201 may display a variety of video signals and text signals. The front board 202 may have buttons for input of various key signals, and transmit a key signal corresponding to a button selected by a user to the main board 210. The display unit 201 may include the proximity sensor and the touch sensor (touch screen) illustrated in FIG. 2.

The front board 202 may be provided with a menu key for allowing a direct input of traffic information, and the menu key may be controlled by the key controller 211.

The audio board 217 may be connected to the main board 210, and process a variety of audio signals. The audio board 217 may include a microcomputer 219 for controlling the audio board 217, a tuner 218 for receiving a radio signal, a power supply unit 216 for supplying power to the microcomputer 219, and a signal processing unit 215 for processing a variety of voice signals.

Also, the audio board 217 may include a radio antenna 220 for reception of radio signals, and a tape deck 221 for reproducing an audio tape. The audio board 217 may further include an audio output unit (for example, amplifier) 226 for outputting signal-processed audio signals.

The amplifier 226 may be connected to a vehicle interface 224. That is, the main board 210 and the audio board 217 are connected to the vehicle interface 224. A hands-free 225a for inputting an audio signal, an airbag 225b for a passenger's safety, a speed sensor 225c for sensing a vehicle speed, and the like may be also connected to the vehicle interface 250. The speed sensor 225c may calculate a vehicle speed and provide information related to the calculated vehicle speed to the CPU 212.

A navigation session 300 applied to the vehicle communication connecting apparatus 200 may provide road guidance information based on map data and current location information of a vehicle.

The display unit 201 may sense a proximity touch within a display window via the proximity sensor. For example, when a pointer (for example, a finger or a stylus pen) gives a proximity touch, the display unit 201 detects the location of the proximity touch and outputs location information related to the detected location to the controller 212.

An audio recognition module (or audio recognition unit) 201 may recognize a voice spoken by a user and perform a corresponding function in response to the recognized voice signal.

The navigation session 300 applied to the vehicle communication connecting apparatus 200 may display a traveling route on map data. When the mobile terminal 100 is located within a preset distance from a dead zone included in the traveling route, the navigation session 300 may automatically establish a wireless network with a terminal (for example, a vehicle-mounted navigator) mounted in a neighboring vehicle and/or a mobile terminal belonging to an adjacent pedestrian via a wireless communication (for example, short-range wireless communication network). Accordingly, the navigation session 300 may receive location information related to the neighboring vehicle from the terminal mounted in the neighboring vehicle, and location information related to the adjacent pedestrian from the mobile terminal belonging to the adjacent pedestrian.

The main board 210 may be connected to the interface unit 230. The interface unit 230 may include an external device interface 231 and a network interface 232.

The external device interface 231 may serve to connect an external device to the vehicle communication connecting apparatus 200. To this end, the external device interface 231 may include an A/V input/output unit (not shown) or a wireless communication unit (not shown).

The external device interface 231 may be connected wirelessly or via a wire to an external device, such as a Digital Versatile Disk (DVD), a Bluray, a game player, a camera, a camcorder, a computer (laptop computer) and the like. The external device interface 231 may allow transferring of image (still image or moving image), audio or data signals input from the exterior via a connected external device to the controller 212 of the vehicle communication connecting apparatus 200. Also, image, audio or data signals processed by the controller 212 may be output to the connected external device. To this end, the external device interface 231 may include an A/V input/output unit (not shown) or a wireless communication unit (not shown).

The A/V input/output unit may allow video and audio signals of the external device to be input in the vehicle communication connecting apparatus 200. Examples of the A/V input/output unit may include a USB terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal and the like.

The wireless communication unit may perform a short-range wireless communication with other electronic equipment. The vehicle communication connecting apparatus 200 may establish a network with other electronic equipment according to communication standards, such as Bluetooth, Radio Frequency Identification (RFID), Infrared Data Association (IrDA), Ultra Wideband (UWB), Zigbee, Digital Living Network Alliance (DLNA) and the like.

Also, the external device interface 331 may be connected to various set-top boxes via at least one of the aforesaid terminals, thus to allow performing of input/output operations with the set-top boxes.

The external device interface 231 may allow receiving of an application or a list of applications within a contiguous external device and transferring of the received application or the list of application to the controller 212 or the memory 213.

The network interface 232 may provide an interface for connection between the vehicle communication connecting apparatus 200 and a wired/wireless network including an Internet network. The network interface 232 may include, for example, an Ethernet terminal or the like for connection to a wired network, and use communication standards, such as Wireless LAN (WLAN) (Wi-Fi), Wireless Broadband (Wibro), World Interoperability for Microwave Access (Wimax), High Speed Downlink Packet Access (HSDPA) and the like, for connection to a wireless network.

The network interface 232 may allow data transmission and reception to/from other user or other electronic device via a connected network or another network linked to the connected network. Especially, the network interface 232 may allow transmitting of part of contents data stored in the vehicle communication connecting apparatus 200 to a user or electronic device selected from other users or electronic devices previously registered in the vehicle communication connecting apparatus 200.

The network interface 232 may allow access to a particular webpage via a connected network or another network linked to the connected network. That is, the network interface 232 may allow access to a particular webpage via a network so as to enable data exchange with the corresponding server. Besides, the network interface 232 may allow receiving of contents or data provided by a contents provider or a network operator. That is, the network interface 232 may allow receiving of contents, such as movie, advertisement, game, VOD, broadcasting signal or the like and related information, which are provided by the contents provider or the network operator, via a network. Also, the network interface 232 may allow receiving of update information related to a firmware and an update file provided by the network operator. In addition, the network interface 232 may allow data transmission to the contents provider or network operator.

The network interface 232 may also allow selection and reception of a desired application of publicly open applications via a network.

Meanwhile, the main board 210 may include at least one sensing unit 240 for sensing whether or not an external device connected via the interface unit 230 is able to communicate with the vehicle communication connecting apparatus 200. The sensing unit 240, for example, may sense whether or not a signal transmission and reception is available via the interface unit 230, thus to determine whether or not the vehicle communication connecting apparatus 200 is connectable with the mobile terminal 100.

Figure 4A:
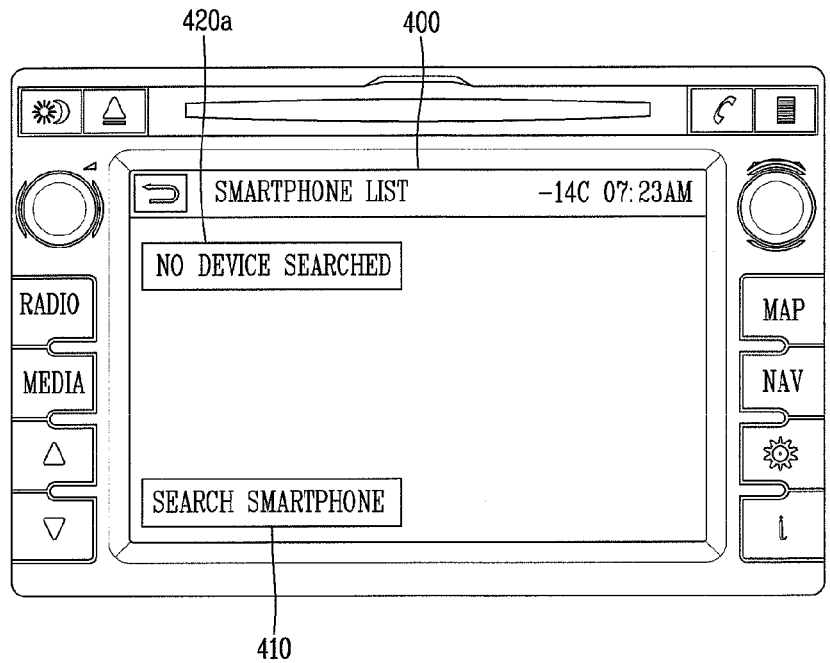
FIGS. 4A and 4B exemplarily illustrate that mobile terminals connectable to the vehicle communication connecting apparatus are displayed with images and identification information according to an embodiment of the invention.
Figure 4B:
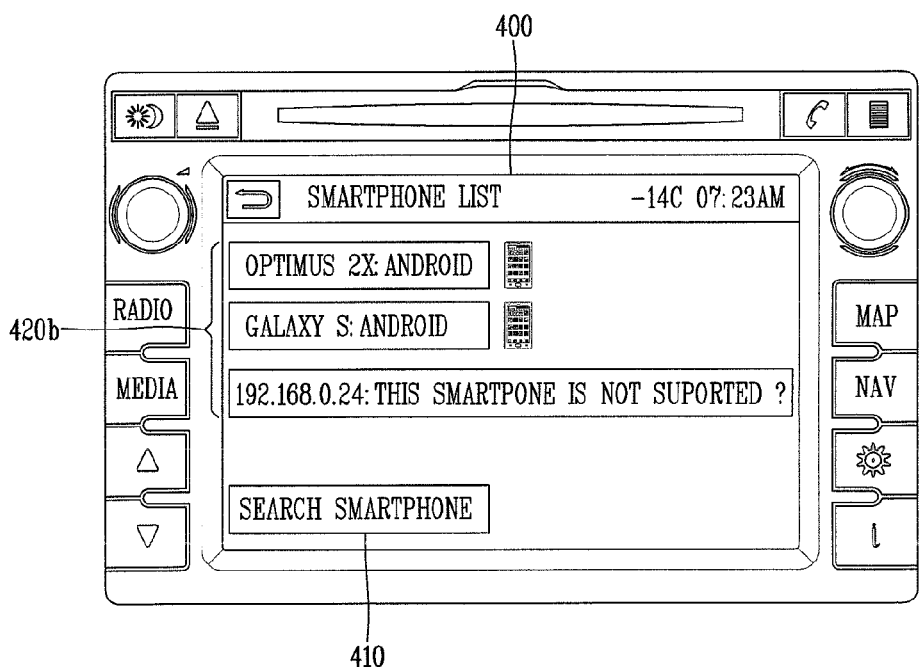

FIGS. 4A and 4B exemplarily illustrate mobile terminals connectable to the vehicle communication connecting apparatus are displayed in form of images and identification information. In FIGS. 4A and 4B, the display unit 400 of the communication connecting apparatus displays an input unit 410 for receiving a request for search for a mobile terminal within a vehicle and search results 420a and 420b. More particularly, FIG. 4A illustrates the search result 420a that any mobile terminal desired to be connected is not present in a vehicle, and FIG. 4B illustrates the search result 420b that connectable mobile terminals and non-connectable mobile terminals within the vehicle are displayed (indicated) in form of images and identification information.

As one example, the communication connecting apparatus receives a user's request for searching for mobile terminals within the vehicle via the input unit 410. FIGS. 4A and 4B illustrate, but not limited to, a touchpad as one example of the interface 410. Alternatively, the communication connecting apparatus may receive a user's request via a keypad, a voice recognition input, or the like.

In FIG. 4B, the search result 420b of the display unit 410 indicates a plurality of connectable mobile terminals in forms of images and text-type identification information so as to be distinguishable from one another. Accordingly, a user can easily quickly find and select a device among the connectable mobile terminals displayed to which the user wants to connect. Also, each image may preferably be displayed as a representative image, which facilitates recognizing of the corresponding mobile terminal. For example, an image of an idle screen, a background screen or a lock screen of a mobile terminal, or an image of execution results of a currently executed application in the mobile terminal may be set as a representative image.

In one exemplary embodiment, a representative image displayed may be a previously stored image, a default image, a captured image or a thumbnail image. Here, the previously stored image may be an image stored in an internal memory or an external memory of each mobile terminal or an image stored in the communication connecting apparatus. The default image, the captured image or the thumbnail image may be an image, which is generated or processed in each mobile terminal to be transmitted to the communication connecting apparatus via the interface unit 230 (see FIG. 2). Alternatively, the communication connecting apparatus may receive a specific image from each mobile terminal and process the received image into a thumbnail image or the like for displaying.

Here, upon receiving an image from each mobile terminal, the communication connecting apparatus may receive such image by fast accessing the mobile terminal using specific identification data, such as a MAC address or the like. In the meantime, the communication connecting apparatus may request an image transmission from each mobile terminal via an appropriate interface to display each representative image, or perform an appropriate command to fetch a representative image stored in the communication connecting apparatus.

In detail, referring to FIG. 3, the communication connecting apparatus may receive a representative image from the mobile terminal 100, which is connected thereto via the external device interface 231 or the network interface 232. For example, the communication connecting apparatus may receive a frame buffer including values associated with all of pixels to be displayed on a screen of the vehicle communication connecting apparatus 200 from the mobile terminal 100 via the interface unit 230. The display unit 201 may then display images received from the mobile terminal 100 under control of the LCD controller 214.

A text-type identification data displayed together with the representative image may be a specific identifier, such as a MAC address of each mobile terminal, a product serial number and the like. In another embodiment, a name of each mobile terminal (for example, user ID, user name, etc.) may further be displayed together with the representative image and the identification data of each mobile terminal, or the same device type of mobile terminals may be grouped based on the identification data to be displayed.

Figure 5A:
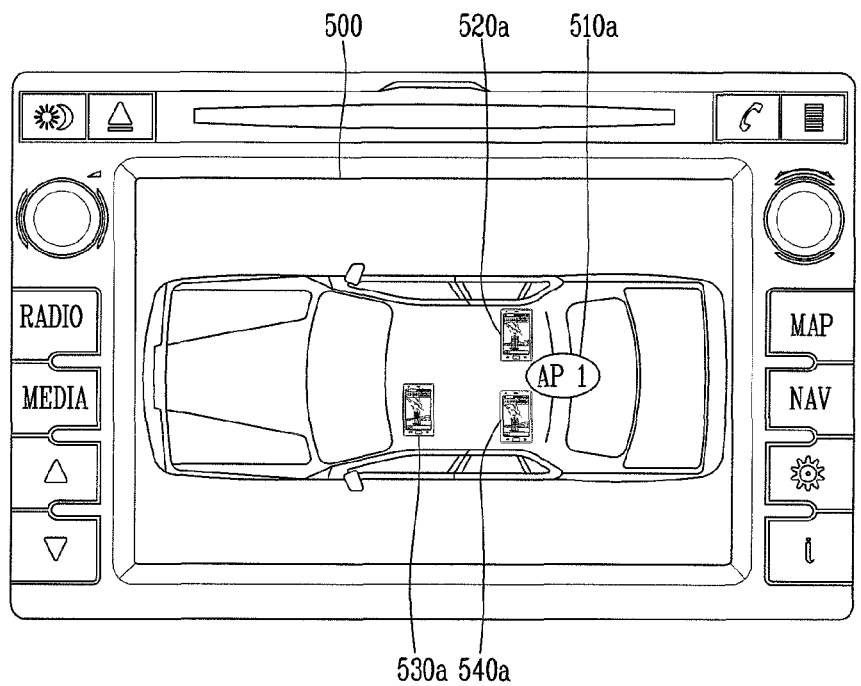
FIGS. 5A and 5B exemplarily illustrate that mobile terminals connectable to the vehicle communication connecting apparatus are displayed with images based on location information according to an embodiment of the invention.
Figure 5B:
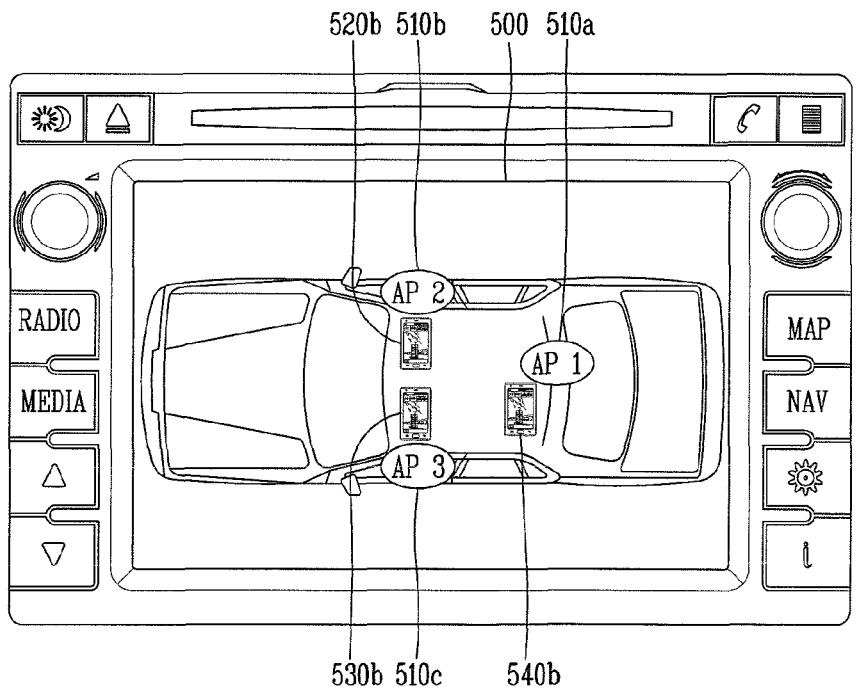

FIGS. 5A and 5B illustrate that mobile terminals connectable to the vehicle communication connecting apparatus are displayed with images based on location information.

As illustrated in FIGS. 5A and 5B, a display unit 500 of the communication connecting apparatus may display connectable mobile terminals 520a, 530a, 540a, 520b, 530b, 540b and wireless access points (APs) 510a, 510b, 510c. That is, FIGS. 4A and 4B illustrate that each mobile terminal connectable with the vehicle communication connecting apparatus is displayed with a representative image and text-type identification information, whereas FIGS. 5A and 5B illustrate that each mobile terminal is displayed with a representative image by considering a location of the corresponding mobile terminal within a vehicle, which allows a user to more quickly find a mobile terminal, to which the user wants to connect.

More especially, FIG. 5A illustrates images of one AP 510a and mobile terminals 520a, 530a, 540a connectable to the vehicle communication connecting apparatus 200 (see FIG. 1), and FIG. 5B illustrates images of three APs 510a, 510b, 510c and mobile terminals 520b, 530b, 540b connectable to the vehicle communication connecting apparatus 200 (see FIG. 1). As will be described herein, when three APs are present within the vehicle, vehicle-mounted mobile terminals may be displayed at more accurate locations.

The communication connecting apparatus may acquire location information related to each mobile terminal that is detected as being connectable. Thus, the location information related to each mobile terminal within the vehicle, as illustrated in FIGS. 5A and 5B, may be acquired by installing APs 510a, 510b, and 510c in the vehicle.

In accordance with one embodiment, for a single AP 510a, location information may be acquired by measuring an approximate distance of each mobile terminal, which is detected based on a Wi-Fi signal strength. Here, since a distance from the single AP 510a is measured, an approximate location information may merely be obtained other than accurate location information considering even relative locations among mobile terminals. As a detailed example, if the Wi-Fi signal strength is relatively strong, information indicating that the mobile terminals 520a and 540a are located close to the AP 510a may be acquired. If the Wi-Fi signal strength is relative weak, information indicating that the mobile terminal 530a is located far away from the AP 510 may be acquired. Here, the AP 510 may not be located at a fixed location, but when a single AP 510 is present, the AP 510 may typically be locatable by the vehicle communication connecting apparatus 200 (see FIG. 3).

As another example, if three APs 510*a*, 510*b*, 510*c* are present, relative locations of connectable mobile terminals mounted in the vehicle may be accurately obtained using a triangulation method. The triangulation method is a method for calculating coordinates and distance of a certain point using the feature of a triangle. In this specification, any method, which is typically known to a person skilled in the art, may be adaptable without specific limitation.

Acquisition of location information of a mobile terminal mounted in a vehicle using the triangulation method may be described as follows. APs 510*a*, 510*b*, 510*c* located at different locations transmit a signal transmission request to corresponding mobile terminals 520*b*, 530*b*, 540*b* that the respective APs 510*a*, 510*b*, 510*c* want to obtain location information thereof. In response to the signal transmission request, the mobile terminals 520*b*, 530*b*, 540*b* perform communications with the APs 510*a*, 510*b*, and 510*c*. Here, the APs 510*a*, 510*b*, 510*c* may preferably use different channels to avoid overlapping with one another, and each mobile terminal 520*b*, 530*b*, 540*b* may preferably be roamed to a channel with the lowest interruption. Communication sensitivities from the mobile terminals 520*b*, 530*b*, and 540*b* may be varied according to the distances from the APs 510*a*, 510*b*, and 510*c*. Such variable communication sensitivities may be used to calculate the distances. Also, three distances calculated from the three APs 510*a*, 510*b*, 510*c* may be used to perform a location calculation by the triangulation method. Consequently, accurate location information related to each mobile terminal 520*b*, 530*b*, and 540*b* may be acquired.

As illustrated, comparing the mobile terminal 510*a* with the mobile terminal 510*b*, it may be noticed that more accurate location can be calculated by the triangulation method. In this invention, the vehicle communication connecting apparatus may include a program for calculating a location by the triangulation method based upon such communication sensitivities. Here, a short-range communication, such as RF communication, ZigBee communication and the like may also be used as well as the Wi-Fi communication.

The calculation process may be repeated by considering the changes of locations of the mobile terminals 520*b*, 530*b*, and 540*b*; thereby the calculated locations may be updated.

In another embodiment, location information related to mobile terminals present within a vehicle may be acquired directly from GPS information using satellites or the like.

Afterwards, in consideration of relative locations among the mobile terminals based on the location information related to each of the mobile terminals obtained through the embodiment, connectable mobile terminals are displayed on the display unit 500 in an image form. Accordingly, a user can search for a mobile terminal to which the user wants to connect more easily and quickly, instead of depending on an image not-based on the location information and/or identification information.

Figure 6:
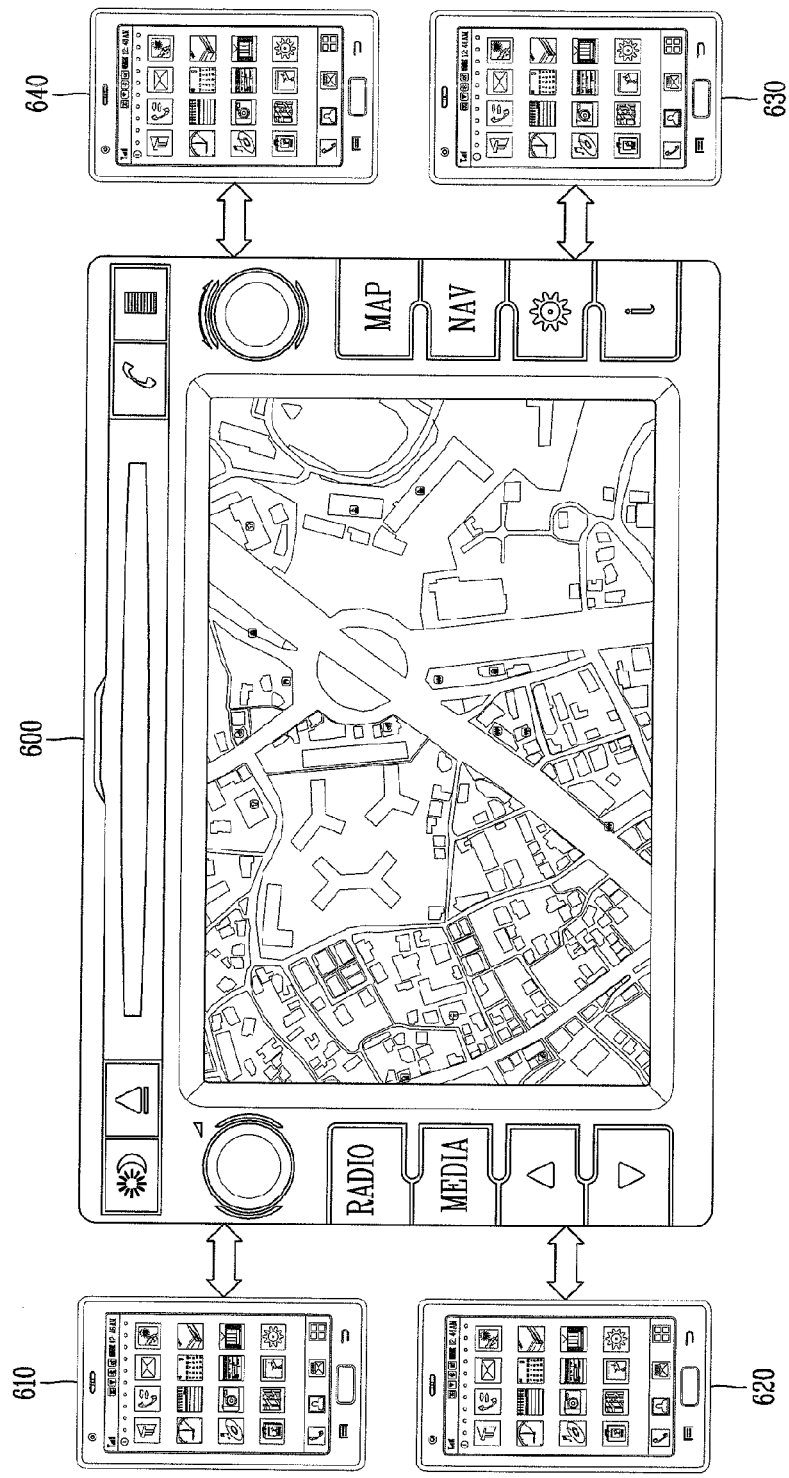
FIG. 6 schematically illustrates that the vehicle communication connecting apparatus is connected to a plurality of mobile terminals according to an embodiment of the invention.

FIG. 6 schematically illustrates that the vehicle communication connecting apparatus is connected to a plurality of mobile terminals. A vehicle communication connecting apparatus 600 may be connected to a plurality of mobile terminals 610, 620, 630, and 640. That is, the plurality of mobile terminals 610, 620, 630, and 640 may access the vehicle communication connecting apparatus 600 to simultaneously transmit execution results of applications, which are being executed in the respective mobile terminal 610, 620, 630, and 640, to the vehicle communication connecting apparatus 600. The vehicle communication connecting apparatus 600 may then receive the plurality of execution results to output them on a single screen at the same time.

Consequently, user's inconvenience and burdens, which are caused as the user performs a separate operation of converting a screen for checking execution results of another application while displaying execution results of a plurality of applications or terminates the received execution result of another application, may be overcome.

For example, the user may receive execution results of a music application from a connected mobile terminal 610 to listen to the music application via a speaker (not shown) of the communication connecting apparatus 600 and simultaneously receive execution results of a navigation application from another connected mobile terminal 620 to display the execution results on a screen of the communication connecting apparatus 600. As another example, the user may receive execution results of an email application from a connected mobile terminal 630 to check the execution result on the screen of the communication connecting apparatus 600 and simultaneously receive execution results of a movie application from another connected mobile terminal 640 to watch the execution result on the screen of the communication connecting apparatus 600.

As such, the user can check execution results of a plurality of applications simultaneously via a single device, and also several persons may simultaneously check execution results of an application executed in a specific mobile terminal present in a vehicle. A technology associated with the process of searching for the application execution results from the plurality of mobile terminals for control has been described in detail with reference to FIG. 1; so detailed description thereof will be omitted.

In one embodiment, considering a case where execution results of a plurality of applications should all be displayed on one screen, the communication connecting apparatus 600 may include a Java 2 Micro-Edition (J2EM) platform built therein for simultaneously displaying execution results of a plurality of applications. The J2EM platform may have a Multiple Virtual Machine (MVM) function and a function of simultaneously displaying execution results of a plurality of applications on one screen. More concretely, in order to display execution results of a first application and execution results of a second application, merely on only necessary areas of an entire screen, each actual frame buffer and each virtual frame buffer may be adjusted differently in size and a size of an image, which is to be displayed on each virtual frame buffer, is adjusted. Afterwards, each of the virtual frame buffers is integrated into one virtual frame buffer. The incorporated one virtual frame buffer may be copied onto the actual frame buffer, thereby simultaneously displaying the actual frame buffer and the copied virtual frame buffer.

Figure 7:
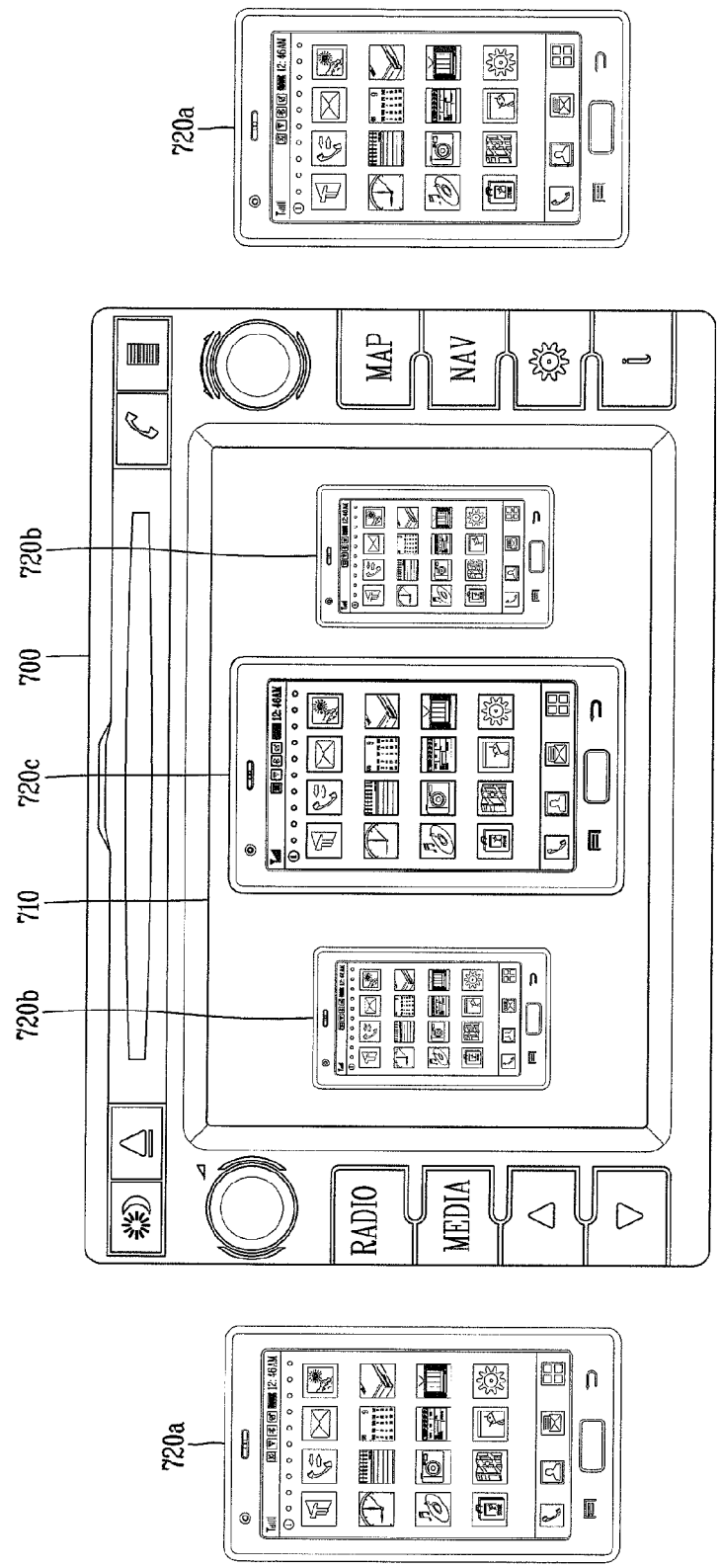
FIG. 7 illustrates that a plurality of mobile terminals connected to the vehicle communication connecting apparatus are displayed in different manners according to a user preference according to an embodiment of the invention.

FIG. 7 illustrates images of a plurality of connected mobile terminals that are displayed with different sizes according to a user preference.

As illustrated in FIG. 7, connected mobile terminals may include a mobile terminal 720*a*, which is connected to the communication connecting apparatus 700 but is not displayed on a display unit 710, a mobile terminal 720*b*, which is connected to the communication connecting apparatus 700 but is displayed in a relatively small size on the display unit 710, and a mobile terminal 720*c*, which is connected to the communication connecting apparatus 700 and displayed in a large size on the display unit 710. As such, whether or not to display on the display unit 710 and a displayed size may be variable depending on a user preference. That is, execution results of an application, in which the user shows great interest, are displayed in a larger size on the display unit 710 such that the user can view the result on a large screen, while execution results of an application, in which the user shows less interest, are displayed in a smaller size. This configuration may be implemented, as aforesaid, by a method of generating execution results of an application highly preferred by a user on a relatively large virtual frame piece, generating execution results of an application less preferred by the user on a relatively small virtual frame piece, copying an integrated virtual frame, which the virtual frame pieces are integrated, onto an actual frame, and displaying the actual frame with the copied virtual frame on one screen. Here, this invention may not be limited to the exemplary embodiment. Such configuration may be implemented by any method of generating results that execution results of plurality of applications are displayed in different sizes on one screen.

In one exemplary embodiment, execution results of a plurality of applications may also be made to have different update periods based upon a user preference. That is, an update period of execution results of an application with high user preference may be made more quickly, such that execution results of the application executed in the corresponding mobile terminal can be fast displayed on the display unit 710 of the communication connecting apparatus 700.

More particularly, referring to FIG. 7, as one example, the mobile terminal 720*c* that the user prefers the most may be displayed at the center of the display unit 710, and the execution results of an application, which is being executed in the mobile terminal 720*c*, may be updated at the fastest period so as to minimize a time difference between the execution results of the application displayed on the communication connecting apparatus 700 and the execution results of the application executed in the mobile terminal. That is, a continuous synchronization is carried out via the interface unit 230 (see FIG. 3). Execution results of an application with respect to a mobile terminal 720*b* with a lower user preference are adjusted to have a less rapid update period. Thus, only the execution result of the application that the user prefers the most can be updated very fast, thereby solving a network load problem, which may be caused by continuously updating execution results of applications for every connected mobile terminal at the same time.

Figure 8:
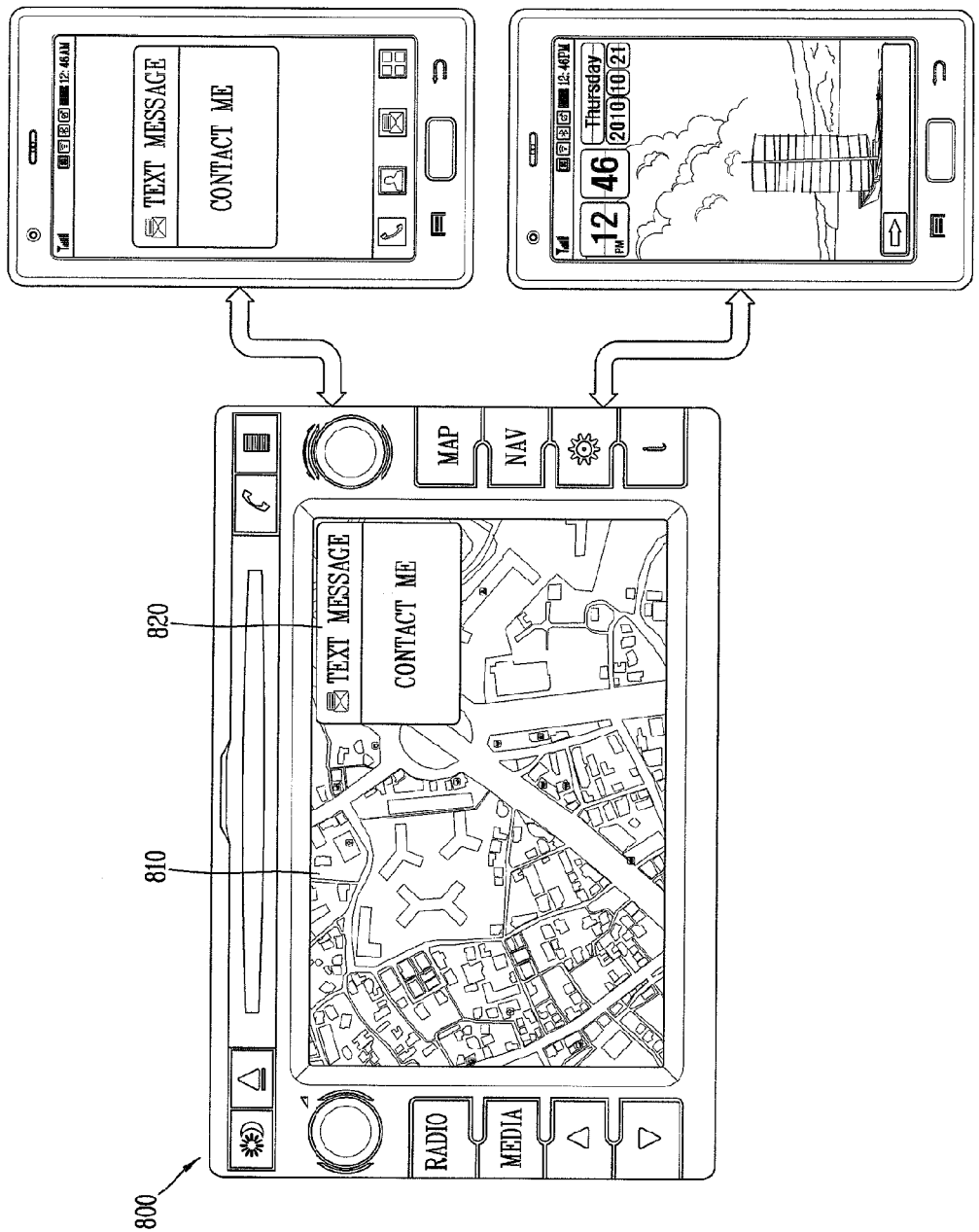
FIG. 8 illustrates a processing upon receiving execution results of an urgent application, which should be processed as soon as possible, while displaying execution results of a specific application according to an embodiment of the invention.

FIG. 8 illustrates a processing upon receiving execution results of an urgent application, which should be processed as soon as possible, while displaying execution results of the specific application. As illustrated in FIG. 8, execution results of an application of the specific mobile terminal selected by a user are displayed on a display unit 810 of a communication connecting apparatus 800. While continuously displaying the application execution results of the connected mobile terminal, if a signal indicating a generation of an important event is received from another connected mobile terminal, the communication connecting apparatus 800 may only display the execution results of the application from which the important event has occurred, irrespective of the a user preference. Alternately, the communication connecting apparatus 800 may display the execution results corresponding to the important event on the display unit 810 together with at least the currently displayed screen. Here, the important event may be, for example, a call or an SMS message being received from a connected mobile terminal. Whether or not an event is important may be determined by the controller 212 (see FIG. 3) of the communication connecting apparatus 800. Here, a specific event may be preset or designated by a user's setting.

In one exemplary embodiment, the important event may be displayed together with a screen, which is currently displayed on the display unit 810. Here, the important event execution result may be displayed by being overridden on a part of the entire screen (820), or displayed with the currently display screen by reducing the size of the currently displayed screen and spatially dividing the display unit 810. This structure is similar to displaying the execution results of the plurality of applications on one screen. Hence, as illustrated with reference to FIG. 6, the J2EM platform may be built in the communication connecting apparatus 800.

In another exemplary embodiment, the device may be configured such that only the important event is displayed on the entire display unit 810, thus suspending the display of the execution results of the current executed application. After completing the processing of the important event, the execution result of the suspended application may be redisplayed on the display unit 810.

Figure 9:
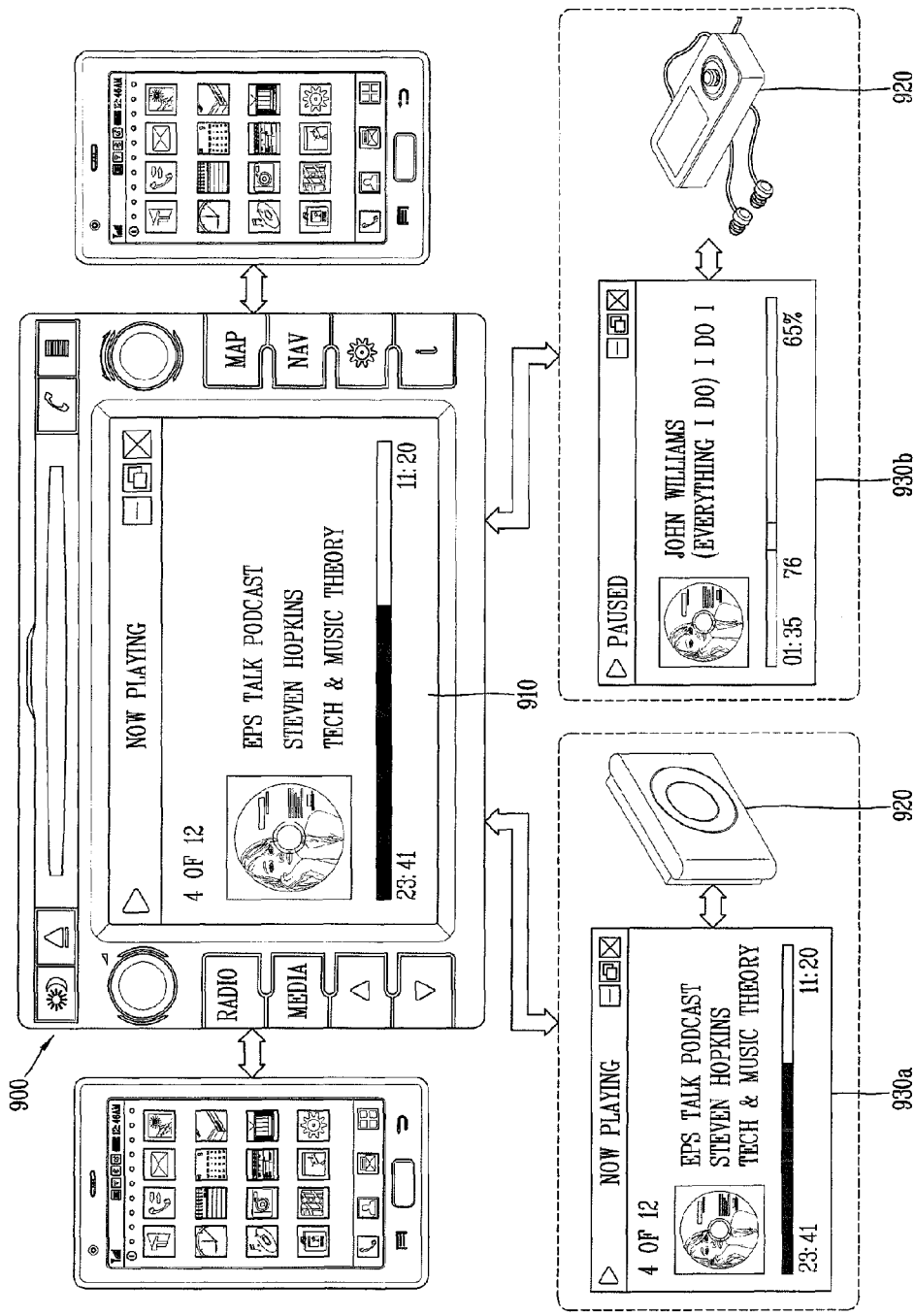
FIG. 9 illustrates a process carried out for mobile terminals for which a screen is not supported according to an embodiment of the invention.

FIG. 9 illustrates a process for mobile terminals for which a screen is not supported (i.e., the mobile terminal without a screen).

Depending on connected mobile terminals, a device itself may not have (or support) a screen. For example, a case may be considered that a device without a screen 920 (e.g., a MP3 player without a screen) is connected to a vehicle communication connecting apparatus 900 and music from the device without a screen 920 is output via a speaker (not shown) of the communication connecting apparatus 900. Even in this case, a user is able to carry out a remote control according to execution results of an application and to recognize a current state of the execution result.

This invention may be implemented such that even when a connected mobile terminal is a device without a screen, corresponding screen and interface for an application execution result can be output on the display unit 910 of the communication connecting apparatus 900. To this end, this invention provides a screen and an interface (e.g., 930*a* and 930*b*) to the device without a screen 920 (e.g., by using a virtual frame buffer).

In one exemplary embodiment, for the device without a screen 920, a GUI is rendered on a virtual frame so as to be transmitted to the communication connecting apparatus 900. The communication connecting apparatus 900 then receives the rendered image and displays the received image on a display unit 910. The rendering indicates a function of enabling an image to be displayed on the display unit 910 of the communication connecting apparatus 900 in a preset form or a form according to a user's setting. Such rendering may be carried out by a request from the communication connecting apparatus 900. Accordingly, the user can control the device without a screen 920 by use of a screen displayed on the display unit 910, and recognize a processed state of the currently executed application. Here, the control for the device without a screen 920 may be performed by mapping an input via an interface, such a touchpad or the like, onto a virtual frame. Other control options are possible.

In another exemplary embodiment, for the device without a screen 920, a screen configuration in an HTML/XML format may be transferred to the communication connecting apparatus 900. The communication connecting apparatus 900 then performs parsing and rendering for such HTML/XML format and displays the rendered screen even with respect to the device without a screen 920, similar to the mobile terminals with a screen. Here, the control for the device without a screen 920 may be performed by processing an input via an interface, such as a touchpad or the like, similar to selection of an object in the HTMS/XML format.

Figure 10:
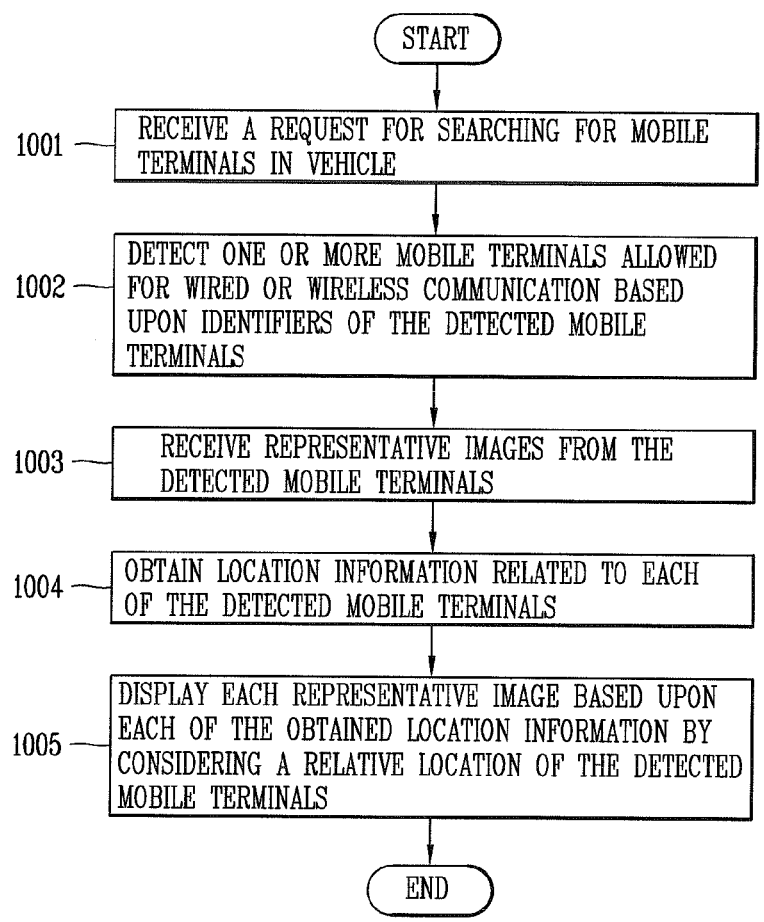
FIG. 10 is a flowchart of an operation method for a vehicle communication connecting apparatus in accordance with this specification according to an embodiment of the invention.

FIG. 10 is a flowchart illustrating an embodiment of an operation method for a vehicle communication connecting apparatus in accordance with this invention. The method of FIG. 10 may be performed by any of the devices described above.

The method is initiated by receiving a request for searching for a mobile terminal within a vehicle by a user input (1001). In response to the request, at least one mobile terminal, which is configured for a wired or wireless communication, is detected based on an identifier of a mobile terminal (1002). At the detecting process, for example, after transmitting a wireless signal to a mobile terminal present within a vehicle, if receiving a response signal from the mobile terminal, the communication connecting apparatus regards the receipt of the response signal as a port being open, thereby recognizing that the mobile terminal is allowed for the wireless communication. However, this invention may not be limited to the manner but various well-known methods in the art may also be used.

The communication connecting apparatus receives a representative image from the detected at least one mobile terminal (1003). In one exemplary embodiment, the representative image may be a previously stored image, a default image, a captured image or a thumbnail image. Here, upon receiving an image from each mobile terminal, such image may be received by fast accessing the corresponding mobile terminal based upon specific identification data, such as a network address or the like. By the way, the communication connecting apparatus may request an image transmission to each mobile terminal via an appropriate interface to display each representative image, or perform an appropriate command to fetch a representative image stored within the communication connecting apparatus. The communication connecting apparatus acquires each location information related to the at least one mobile terminal, which has been detected as being able to perform the wired or wireless communication (1004). An AP within a vehicle may acquire location information related to each mobile terminal, for example. That is, a distance is measured from the AP based on a communication sensitivity for each mobile terminal, namely, a signal strength, thereby acquiring such location information. If three APs are present, communication sensitivity for each mobile terminal is measured from each AP and accurate location information may be acquired by a triangulation method. As another example, location information related to mobile terminals within a vehicle may be obtained directly from GPS information.

Based on each of the acquired location information, the representative image received at step 1003 is displayed on a screen of the communication connecting apparatus by considering a relative location of each mobile terminal (1005). Consequently, the mobile terminals connectable to the communication connecting apparatus are displayed as location-based images such that the user can more quickly recognize (or identify) connectable mobile terminals present within the vehicle.

Figure 11:
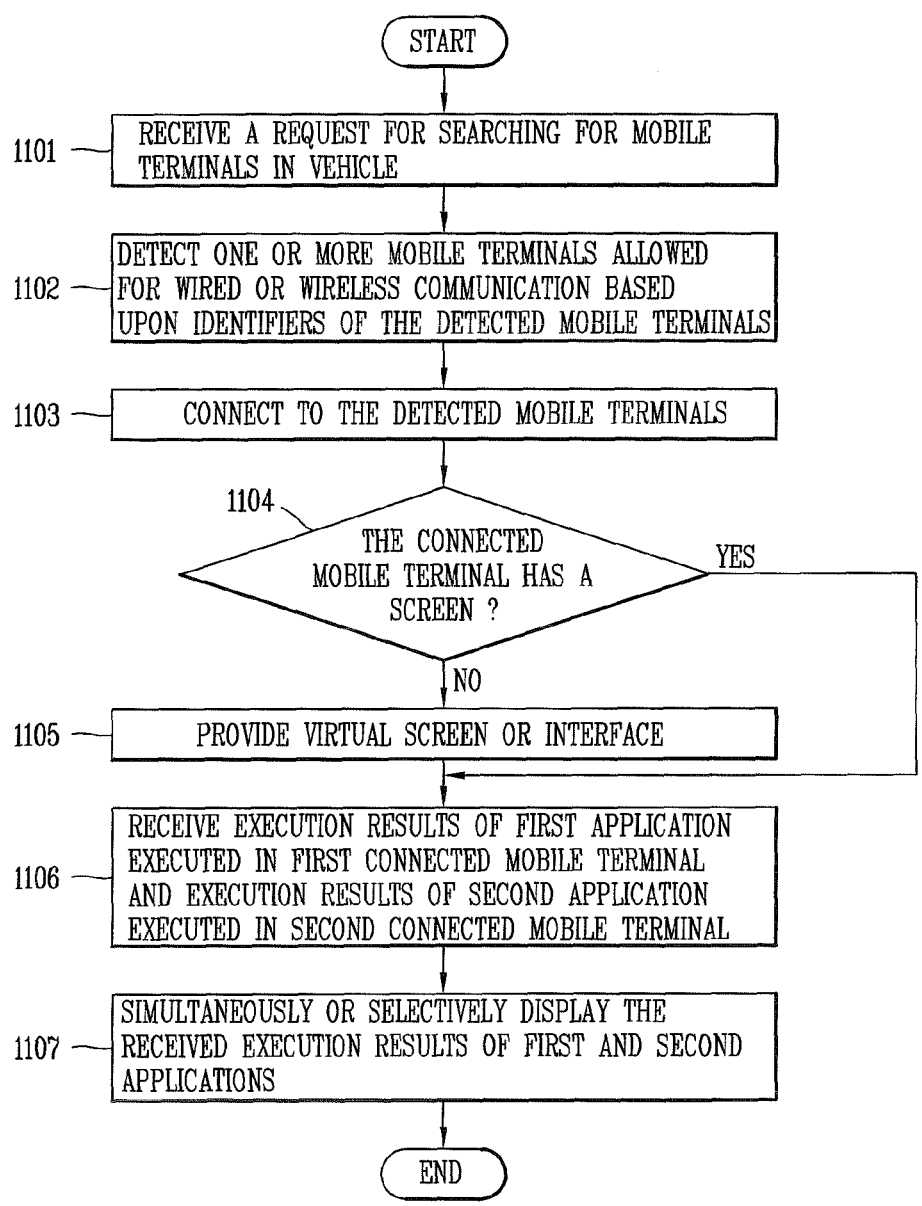
FIG. 11 is a flowchart illustrating an operation method for the vehicle communication connecting apparatus according to an embodiment of the invention.

FIG. 11 is a flowchart illustrating another embodiment of an operation method for the vehicle communication connecting apparatus.

The method is initiated as receiving a request for searching for a mobile terminal within a vehicle by a user input (1101). In response to the request, at least one mobile terminal, which is allowed for a wired or wireless communication, is detected based on an identifier of a mobile terminal (1102). At the detecting process, for example, after transmitting a wireless signal to a mobile terminal present within a vehicle, if receiving a response signal from the mobile terminal, the communication connecting apparatus regards the received response signal as a port being open, thereby recognizing that the mobile terminal is allowed for the wireless communication. However, this invention may not be limited to the manner but various well-known methods in the art may also be used.

The communication connecting apparatus is connected to the detected at least one mobile terminal via a wire or wirelessly (1103). The connection of the mobile terminal may be implemented, as described in detail with reference to FIGS. 1 and 3, using a short-range communication standard such as Bluetooth or the like, a wireless Internet standard such as Wi-Fi or the like, an external device interface standard such as USB or the like.

If the connected mobile terminal is determined to be a device without a screen (1104), a screen and an interface are provided (e.g., using a virtual frame buffer) (1105). As one example, for a mobile terminal without a screen, a GUI is rendered on a virtual frame and transmitted to the communication connecting apparatus. The communication connecting apparatus may then receive the rendered image and display the received image on a display unit. As another example, for a mobile terminal without a screen, a screen configuration in an HTML/XML format is transferred to the communication connecting apparatus. The communication connecting apparatus then performs parsing and rendering for such HTML/XML format and displays the rendered screen even with respect to the mobile terminals without a screen, similar to the mobile terminals with a screen.

At step 1106, when a single mobile terminal is connected, execution results of an application, which is being executed in the mobile terminal, is received. When a plurality of mobile terminals is connected, execution results of a first application are received from a first connected mobile terminal and execution results of a second application is received from a second connected mobile terminal. The received execution results of the first and second applications are either simultaneously or selectively displayed on the communication connecting apparatus at the same time (1107). The displayed application execution results may be implemented such that update speed, screen size or volume thereof can be adjusted according to a user preference or event importance. Accordingly, a user can view execution results of a plurality of applications simultaneously or selectively on one communication connecting apparatus.

As such, according to a vehicle communication connecting apparatus and an operation method thereof in accordance with one exemplary embodiment, connectable mobile terminals within a vehicle can be displayed with images and identification information to be distinguishable from one another, thereby facilitating fast recognition of a mobile terminal which is desired to be connected even when a plurality of mobile terminals are present in the vehicle.

Also, according to a vehicle communication connecting apparatus and an operation method thereof in accordance with one exemplary embodiment, execution results of applications executed in a plurality of mobile terminals can be integrally displayed simultaneously on one screen, thereby providing the same effect as several functions being simultaneously executed in one device.

According to a vehicle communication connecting apparatus and an operation method thereof in accordance with one exemplary embodiment, execution results of a plurality of applications can be displayed on one screen. Accordingly, user's inconvenience and burden, which are caused as the user should convert a screen to check execution results of an application while another application is being executed, or terminate the previously executed application, can be overcome.

In addition, according to a vehicle communication connecting apparatus and an operation method thereof in accordance with one exemplary embodiment, execution results of applications, which are executed in a plurality of mobile terminals, can be displayed by adjusting update speed, screen size or volume of the execution results according to a user preference and event importance. Consequently, even when integrally executing a plurality of applications, a network load can be reduced and execution results of an application, which is needed to be urgently processed, can be primarily processed.

Meanwhile, the operation method for a communication connecting apparatus in accordance with one exemplary embodiment may be implemented as processor-readable codes in a recording medium, which a processor provided in the vehicle communication connecting apparatus 200 is readable. The processor-readable medium may include all types of recording devices each storing data readable by a processor. Examples of such processor-readable media may include ROM, RAM, CD-ROM, magnetic tape, floppy disk, optical data storage element and the like. The processor-readable medium may be existent by being distributed in a computer system connected via a network and store and execute the processor-readable codes in the distribution manner.

What is claimed is:

1. An electronic device configured to be installed in a vehicle, the electronic device comprising:
    a display unit;
    a wireless communication device; and
    a controller operatively connected to the display unit and the wireless communication device, the controller configured to
        simultaneously interface with a first mobile terminal within the vehicle and a second mobile terminal within the vehicle, the first mobile terminal performing a first function and the second mobile terminal performing a second function different that the first function, and
        display information regarding at least one of the first function and the second function.

2. The electronic device of claim 1, wherein the controller is configured to
    transmit a message to identify mobile terminals present within the vehicle,
    detect the first mobile terminal and the second mobile terminal based on corresponding responses by the first mobile terminal and the second mobile terminal to the message, and
    display an image corresponding to at least one of the first mobile terminal and the second mobile terminal, the image being one of an image stored in the electronic device and an image received from the corresponding mobile terminal.

3. The electronic device of claim 2,
    wherein the controller is configured to transmit the message to identify mobile terminals present within the vehicle based on one of a user input and a specific vehicle event,
    wherein the specific vehicle event is one of starting the vehicle, opening a door of the vehicle, changing a speed of the vehicle above or below a predetermined threshold, and a timer event.

4. The electronic device of claim 2, wherein the controller is configured to simultaneously display images of each of the first mobile terminal and the second mobile terminal.

5. The electronic device of claim 2, wherein the controller is configured to
    acquire location information of the first mobile terminal and the second mobile terminal, the location information identifying a location within the vehicle of the first mobile terminal and the second mobile terminal, respectively, and
    display the images corresponding to the first mobile terminal and the second mobile terminal based on the respective location information of the first mobile terminal and the second mobile terminal,
    wherein the location information includes one of
        GPS information,
        direction information from a plurality of access point within the vehicle, and
        a measured signal strength of a signal from the first mobile terminal and the second mobile terminal, respectively.

6. The electronic device of claim 1, wherein the controller is configured to simultaneously display information regarding both of the first and second functions.

7. The electronic device of claim 1, wherein the controller is configured to
    determine that one of the first mobile terminal and the second mobile terminal does not contain a display screen, and
    display an interface corresponding to the one of the first mobile terminal and the second mobile terminal that does not contain a display screen.

8. The electronic device of claim 1, wherein the controller is configured to control the first function and the second function to be differently processed according to a function priority, the function priority being one of a user set priority and a predetermined priority.

9. The electronic device of claim 8, wherein the controller is configured to differently process one of an update speed, a screen size and a volume of the first function and the second function based on the function priority.

10. The electronic device of claim 8, wherein the controller is configured to differently display execution results of the first function and the second function according to the function priority and according to a predetermined event occurrence such that a result of a lower priority function corresponding to the predetermined event occurrence is processed irrespective of the function priority.

11. A method of controlling an electronic device installed in a vehicle, the method comprising:
    simultaneously interfacing with a first mobile terminal within the vehicle and a second mobile terminal within the vehicle, the first mobile terminal performing a first function and the second mobile terminal performing a second function different that the first function; and
    displaying information regarding at least one of the first function and the second function.

12. The method of claim 11, further comprising:
    transmitting a message to identify mobile terminals present within the vehicle;
    detecting the first mobile terminal and the second mobile terminal based on corresponding responses by the first mobile terminal and the second mobile terminal to the message; and
    displaying an image corresponding to at least one of the first mobile terminal and the second mobile terminal, the image being one of an image stored in the method and an image received from the corresponding mobile terminal.

13. The method of claim 12,
    wherein the step of transmitting the message comprises transmitting the message based on one of a user input and a specific vehicle event, and wherein the specific vehicle event is one of starting the vehicle, opening a door of the vehicle, changing a speed of the vehicle above or below a predetermined threshold, and a timer event.

14. The method of claim 12, wherein the step of displaying an image corresponding to at least one of the first mobile terminal and the second mobile terminal comprises:
simultaneously displaying images of each of the first mobile terminal and the second mobile terminal.

15. The method of claim 12, further comprising:
acquiring, by the electronic device, location information of the first mobile terminal and the second mobile terminal, the location information identifying a location within the vehicle of the first mobile terminal and the second mobile terminal, respectively; and
displaying the images corresponding to the first mobile terminal and the second mobile terminal based on the respective location information of the first mobile terminal and the second mobile terminal,
wherein the location information includes one of
GPS information,
direction information from a plurality of access point within the vehicle, and
a measured signal strength of a signal from the first mobile terminal and the second mobile terminal, respectively.

16. The method of claim 11, wherein the step of displaying information regarding at least one of the first function and the second function comprises:
simultaneously displaying information regarding both of the first and second functions.

17. The method of claim 11, further comprising:
determining that one of the first mobile terminal and the second mobile terminal does not contain a display screen; and
displaying one of a screen and an interface corresponding to the one of the first mobile terminal and the second mobile terminal that does not contain a display screen.

18. The method of claim 11, further comprising:
controlling the first function and the second function to be differently processed according to a function priority, the function priority being one of a user set priority and a predetermined priority.

19. The method of claim 18, wherein the step of controlling the first function and the second function to be differently processed comprises:
differently processing one of an update speed, a screen size and a volume of the first function and the second function based on the function priority.

20. The method of claim 18, wherein the step of controlling the first function and the second function to be differently processed comprises:
differently displaying execution results of the first function and the second function according to the function priority and according to a predetermined event occurrence such that a result of a lower priority function corresponding to the predetermined event occurrence is processed irrespective of the function priority.

* * * * *